United States Patent [19]

Liu

[11] Patent Number: 5,473,836
[45] Date of Patent: Dec. 12, 1995

[54] PEST AND INSECT EXPELLER OF AN ELECTROMAGNETIC TYPE

[76] Inventor: Michael Liu, No. 15, Alley 291, Sec. 1, Chien-Kuo Chien-Kuo S. Rd., Taipei, Taiwan

[21] Appl. No.: 147,565

[22] Filed: Nov. 5, 1993

[51] Int. Cl.⁶ ............................................. A01M 1/02
[52] U.S. Cl. ......................... 43/124; 367/139; 116/22 A
[58] Field of Search ................................ 43/124, 132.1; 367/139; 116/22 A

[56] References Cited

U.S. PATENT DOCUMENTS

| | | | |
|---|---|---|---|
| 2,783,760 | 3/1957 | Smith | 43/132.1 |
| 2,812,612 | 11/1957 | Vang | 43/124 |
| 3,657,715 | 4/1972 | Curtin | 340/311 |
| 4,097,838 | 6/1978 | Fiala | 43/124 |
| 4,163,966 | 8/1979 | Mounce | 43/124 |
| 4,219,884 | 8/1980 | DeSantis | 43/124 |
| 4,484,315 | 11/1984 | Hall | 43/124 |
| 5,196,823 | 3/1993 | Formigoni | 43/124 |

FOREIGN PATENT DOCUMENTS 4026589  2/1992  Germany .................................. 43/124

Primary Examiner—P. Austin Bradley
Assistant Examiner—James Miner
Attorney, Agent, or Firm—Bacon & Thomas

[57] ABSTRACT

A structure of an pest and insect expeller of an electromagnetic type comprises astable multivibrator circuits an electromagnetic sound generator, a heat dissipation system, and conductor power wires, wherein the astable multivibrators produce a series of intermittent and varying signals. The electromagnetic sound generator makes use of the inductance of an electromagnetic field to create physical vibrations, resulting in electromagnetically vibrated sound waves. The sound waves are delivered by the medium of conductor power wires to all indoor power lines and ground wires connected to the apparatus of the invention, and are distributed all over room corners, cracks on walls, and gaps so that insects will feel uncomfortable and get out of hidden places, as a result, the apparatus can achieve its effect.

6 Claims, 7 Drawing Sheets

PEST AND INSECT EXPELLER OF AN ELECTROMAGNETIC TYPE

BACKGROUND OF THE INVENTION

FIELD OF THE INVENTION

The invention relates to a home use pest and insect expeller, and particularly to ah improved structure of a pest and insect expeller that makes use of electromagnetically generated sound waves to accomplish the effect of expelling mice and bad insects.

SUMMARY OF THE INVENTION

The primary object of the invention is to provide a structure of a pest and insect expeller that uses electromagnetic vibrations to produce sound waves that are transmitted by a power line or ground wires to the whole electric power system connected to the pest and insect expeller to drive out mice and insects residing in the room corners, cracks on walls, and gaps.

A further object of the invention is to provide a structure of a pest and insect expeller by which the sound waves produced are intermittent and varied, as a consequence of which mice and insects will not become accustomed to the sound waves even when exposed to the sound waves for a long time so that the pest and insect expeller can maintain its efficacy.

Another object of the invention is to provide a structure of a pest and insect expeller that is equipped with a heat dissipation system to lower the temperatures of coils of the electromagnetic sound generator so that the pest and insect expeller can work continuously for a long duration without bad effects to its performances.

Still another object of the invention is to provide a structure of a pest and insect expeller on one side of which is provided with a heat dissipation system that makes use of air circulation to lower the temperature of the sound generator to protect the service life as well as to enhance the working capacity of the sound generator.

To accomplish the foregoing objects, the invention makes use of astable multivibrator circuits, an electromagnetic sound generator, a power line capable of transmitting sound waves, a fireproof plastic casing, and a heat dissipation system to construct an pest and insect expeller in which the astable multivibrators cyclically function for three minutes and thirty seconds and then interrupt for one minute and twenty-five seconds. The astable multivibrators produce outputs having a varying frequency pulse width modulated output irregularly varying from 0.3 second to 0.7 second to activate the electromagnetic sound generator and result in vibrated sound waves that are transmitted through a power line to the power system connected to the pest and insect expeller and that are distributed all over the house to drive out mice and bad insects hidden in room corners or cracks on the walls. Besides, to avoid accidental injuries incurred by the high temperature of a working electromagnetic sound generator or an electric leakage, the pest and insect expeller of the invention adopts a casing made of a fireproof plastic material and a heat dissipation system to lower the temperature so that the pest and insect expeller can work for a long time without bad effects to its service life. The sound waves, after being generated, are transmitted through an electrical power system hidden in the walls and have vibration frequencies harmless to people and of no influence to broadcasting frequencies or currents and so the pest and insect expeller of the invention does not affect other home used electric appliances.

The foregoing and additional objects, features and advantages of the invention will become apparent from the detailed description when read in conjunction with the accompanying drawings.

DETAILED DESCRIPTION OF THE PREFERRED EMBODIMENTS

Figure 1:
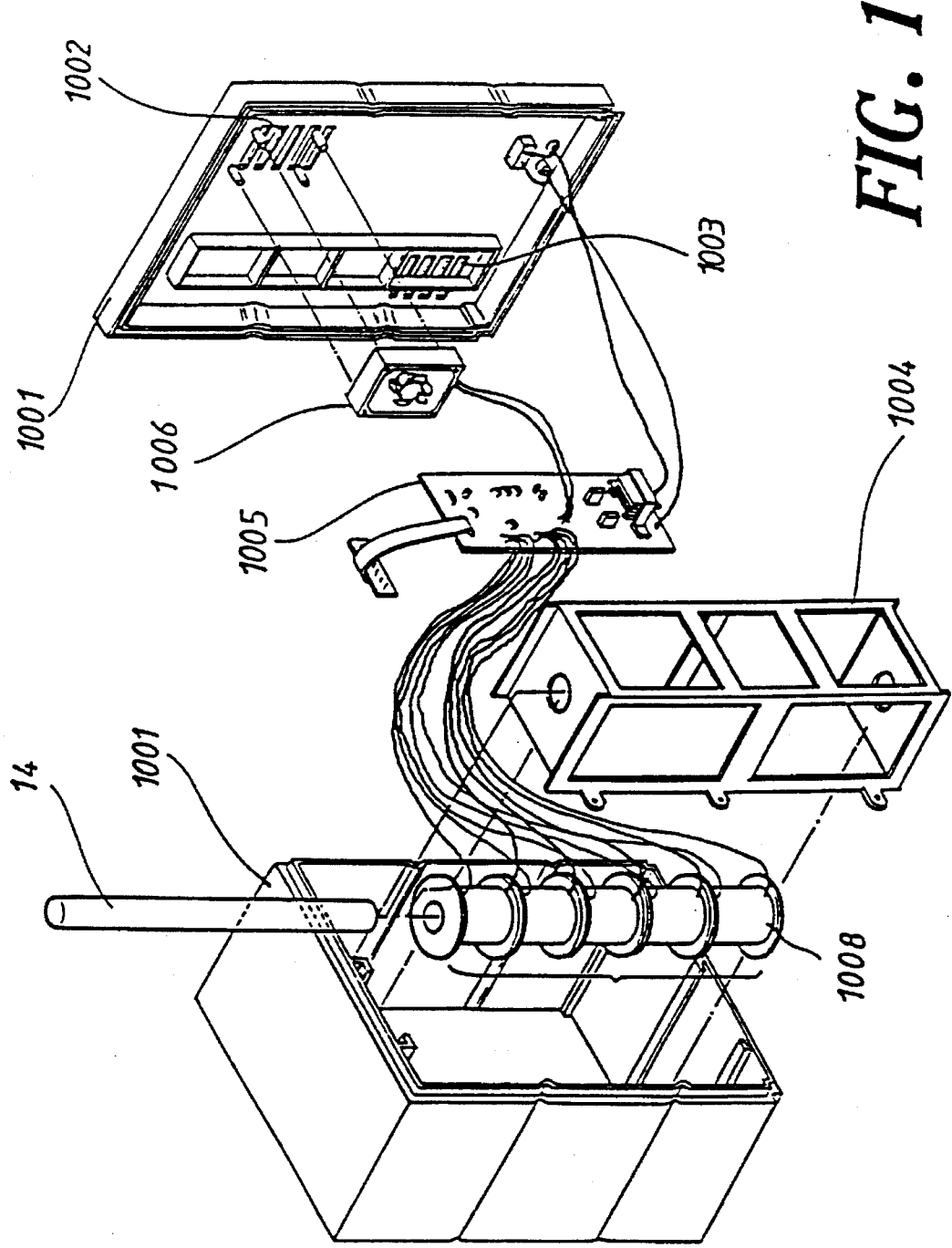
FIG. 1 is a perspective exploded view displaying separately parts of an embodiment of a pest and insect expeller according to the invention.
Figure 2:
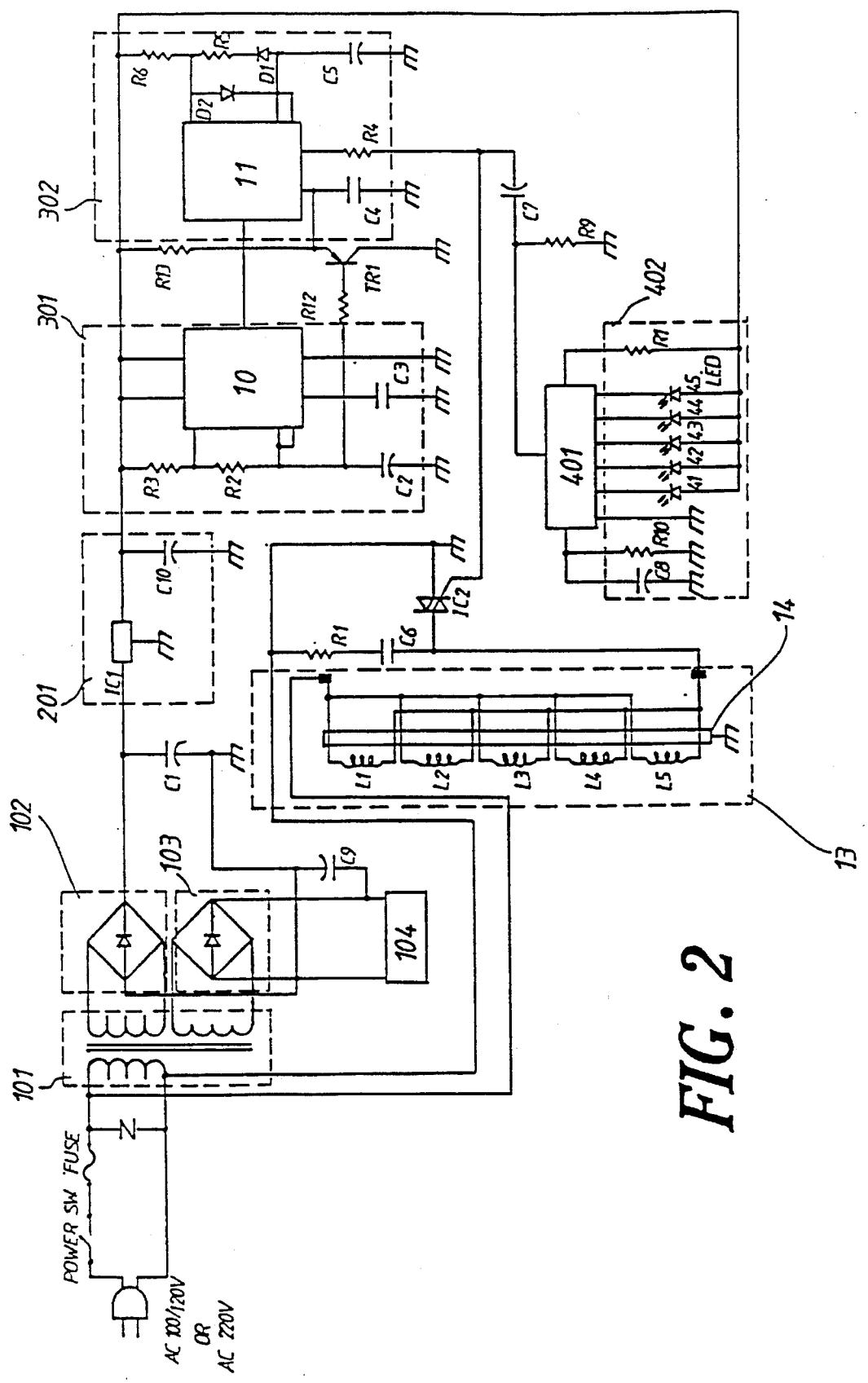
FIG. 2 is a schematic diagram illustrating the circuitry of a pest a insect expeller of the invention that uses a two-wire alternating current power source.
Figure 7:
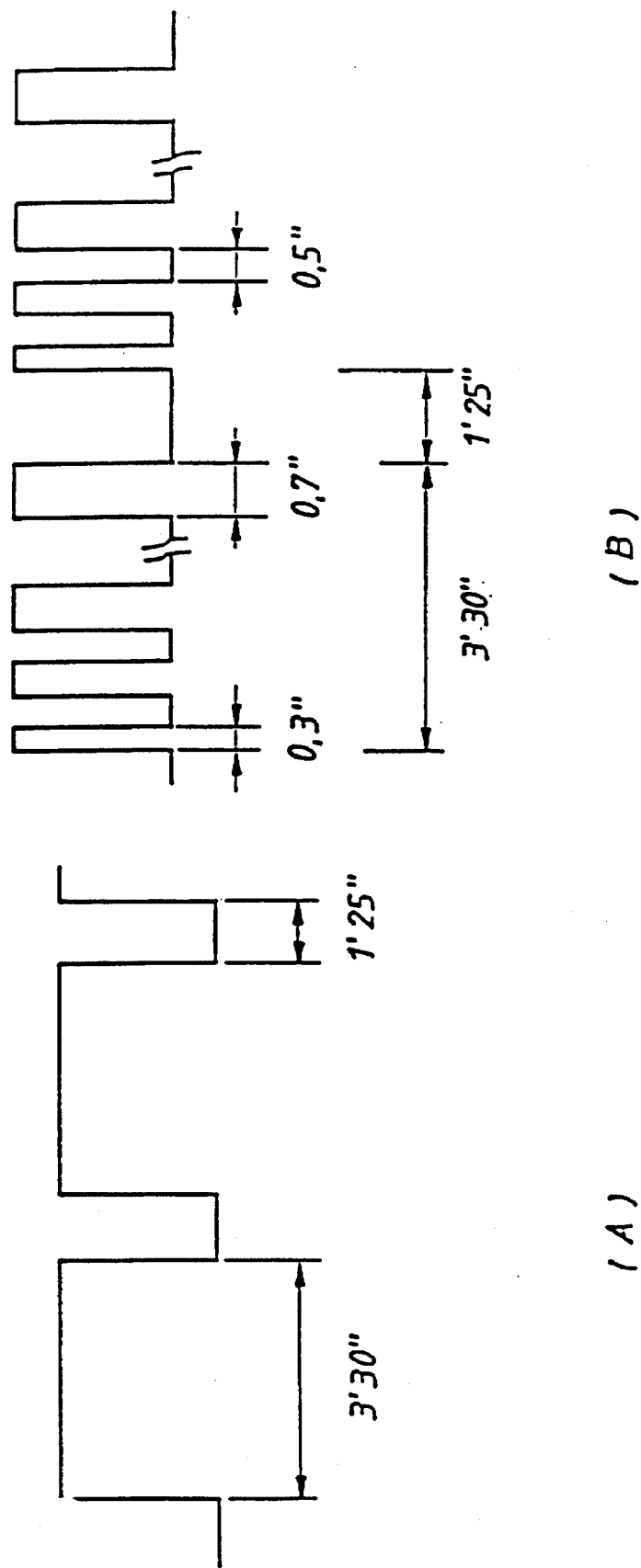
FIG. 7 is a diagram showing the output wave forms of the pest and insect expeller shown in FIG. 1.

FIG. 1 depicts a pest and insect expeller of a preferred embodiment of the invention of which the Casing 1001 is made of a fireproof plastic material to protect bodies from possible injuries incurred by an electric leakage or high temperatures. A hot air discharge outlet 1002, a cold air intake 1003, and a fan 1006 make up a heat dissipation system 104 that makes use of forced air circulation to cool the pest and insect expeller. That is, cold air is introduced into the pest and insect expeller to cool the electromagnetic sound generator 13, which is made up of coils 1008 and a vibrating steel bar 14, and the heat issued from the working sound generator is drawn off by the fan 1006 and exhausted to the outside through the hot air discharge outlet 1002. The more coils in the sound generator, the stronger the vibration of steel bars 14 and the higher the temperature rise. However, with the aid of the heat dissipation system 104, the pest and insect expeller of the invention can employ at least five inductance coils without the problem of overheating. A stand 1004 is used to hold the sound generator 13 in position and a printed circuit assembly 1005 provides the control system for the pest and insect expeller of the invention Referring to FIG. 2, a 100 to 120 volt alternating current electrical power source or a 220 volt alternating current electrical power source can be used for the pest and insect expeller. Through a voltage transformer 101 and current rectifiers 102 and 103, the electrical power source is converted into a direct current source with a lower voltage and then, passing through a voltage regulation integrated circuit IC1, is further altered into a power source having the desired working voltage. An astable multivibrator 10, in association with resistors R2 and R3, and capacitors C2 and C3, as shown in FIG. 2 to produce a series of intermittent wave forms as shown in FIG. 7A, in which the wave lasts for three minutes and thirty seconds and then interrupts for one minute and twenty-five seconds to control another astable multivibrator 11. The astable multivibrator 11 works in association with diodes D1, and D2, resistors R5, and R6 and a capacitor C5 as well as the transistor circuit constituted by a transistor TR1, and resistors R12, R13. When receiving a continuously varying voltage from the astable multivibrator 10 via the transistor TR1, the astable multivibrator 11 produces a series of intermittent and varied waves as shown in FIG. 7B in which the pulse width modulated output; irregularly varies from 0.3 second to 0.7 second. By a means of a triac IC2 the intermittent and varying signals control the electromagnetic sound generator 13 to produce a series of intermittent and varying sound waves that spread over the indoor electrical power system installed inside the walls via the power wires. The electromagnetic sound generator 13, constituted by a plurality of coils L1 to L5 and a cylindrical steel bar 14 passing through the centers of the coils, can produce strong impacts and vibrations due to electromagnetic inductance, resulting in sound waves having a frequency of sixty cycles per minute. The integrated circuit 401 controls light emitting diodes 41 to 45 to flash by turns like a revolving pilot light, indicating the system in use. In addition, the heat dissipation system 104 is Used to lower high temperatures resulting from the working electromagnetic sound generator 13, which enables the pest and insect expeller of the invention to employ at least five electromagnetic coils without the problem of overheating. Therefore, the pest and insect expeller has greater striking forces, which in turn has stronger vibrations for steel bars 14 and produces stronger sound waves, and can be used continuously for a long duration without bad effects to its performances.

Figure 3:
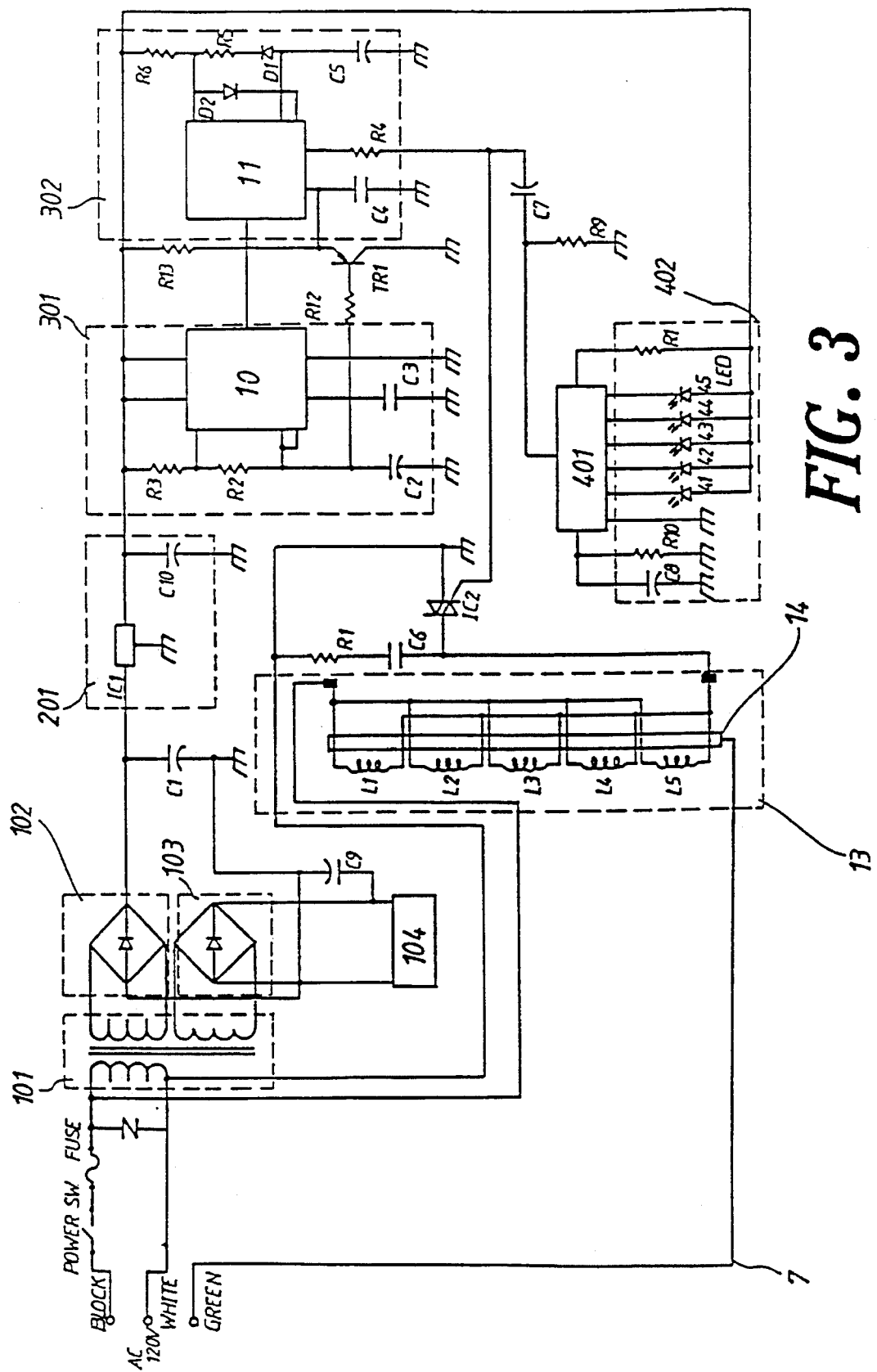
FIG. 3 is another schematic diagram depicting the circuitry of the invention, similar to FIG. 2 except the use of a three-wire alternated current power source.

Generally the circuitry shown in FIG. 3 operates in the same way as the one shown in FIG. 2 except for the use of a three-wire electrical power system that connects the steel bars of the sound generator 13 to the ground wire 7 of the power system so that sound waves can spread over the house via the ground wire 7. On the basis of the construction, the electromagnetic pest and insect expeller of the invention can deliver vibrated sound waves by means of an alternating current power line or a ground wire of a power line and further distributes the sound waves to the whole electric power system installed in the walls via a power line communication with the power system.

Figure 4:
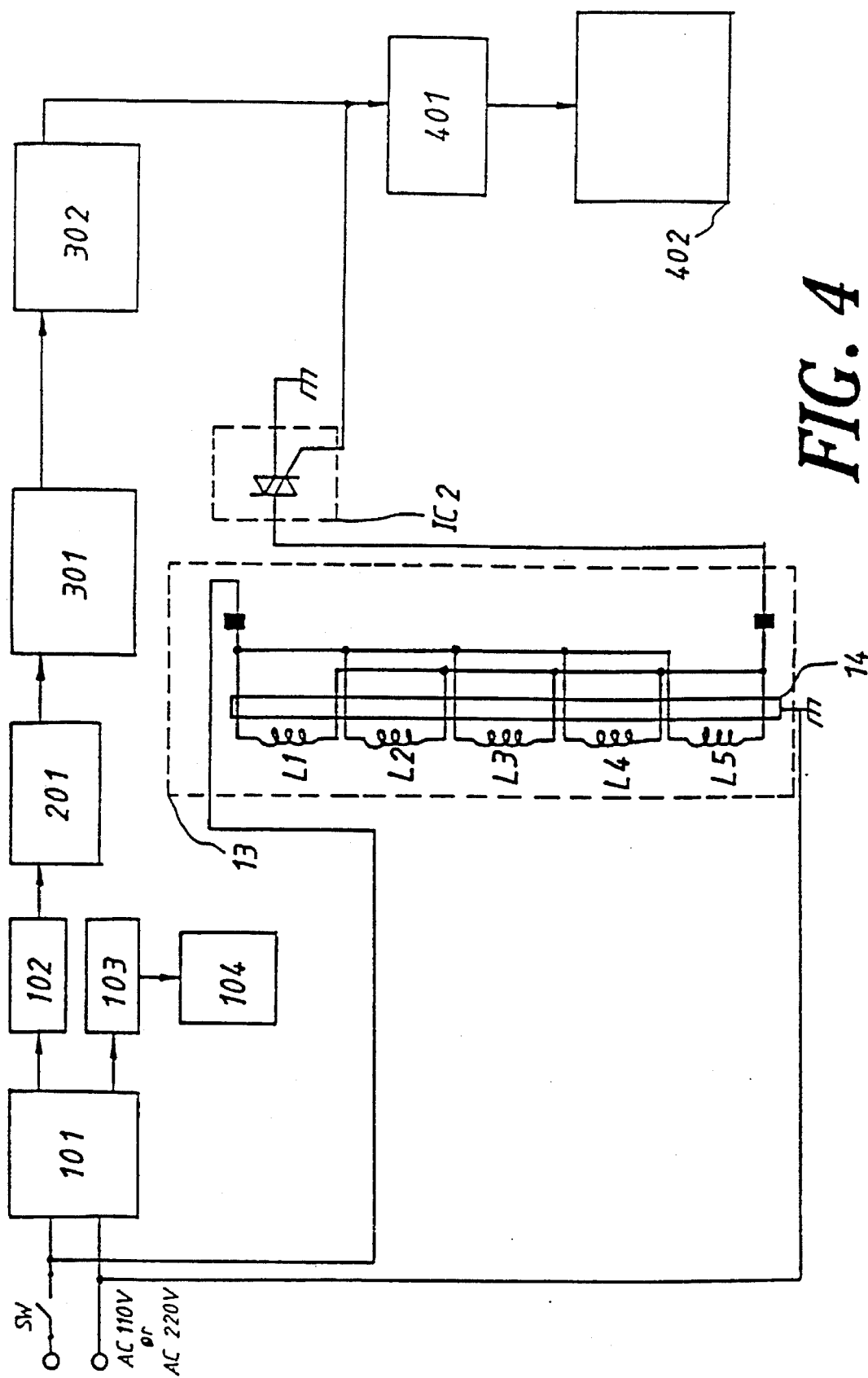
FIG. 4 is a block diagram of the circuitry shown in FIG. 2.

FIG. 4 is a block diagram of the pest and insect expeller of the invention, in which the voltage transformer 101, the current rectifiers 102, and 103, and the voltage regulation circuit 201 are constituents of a power supply system for the pest and insect expeller, the heat dissipation system 104 is used to dispel the heat of the sound generator 13, and two astable multivibrators 301 and 302 produce signals controlled by a triac IC2 to make the sound generator issue sound waves of high frequency that are distributed through the power line to the whole power system connected to the apparatus.

Figure 5:
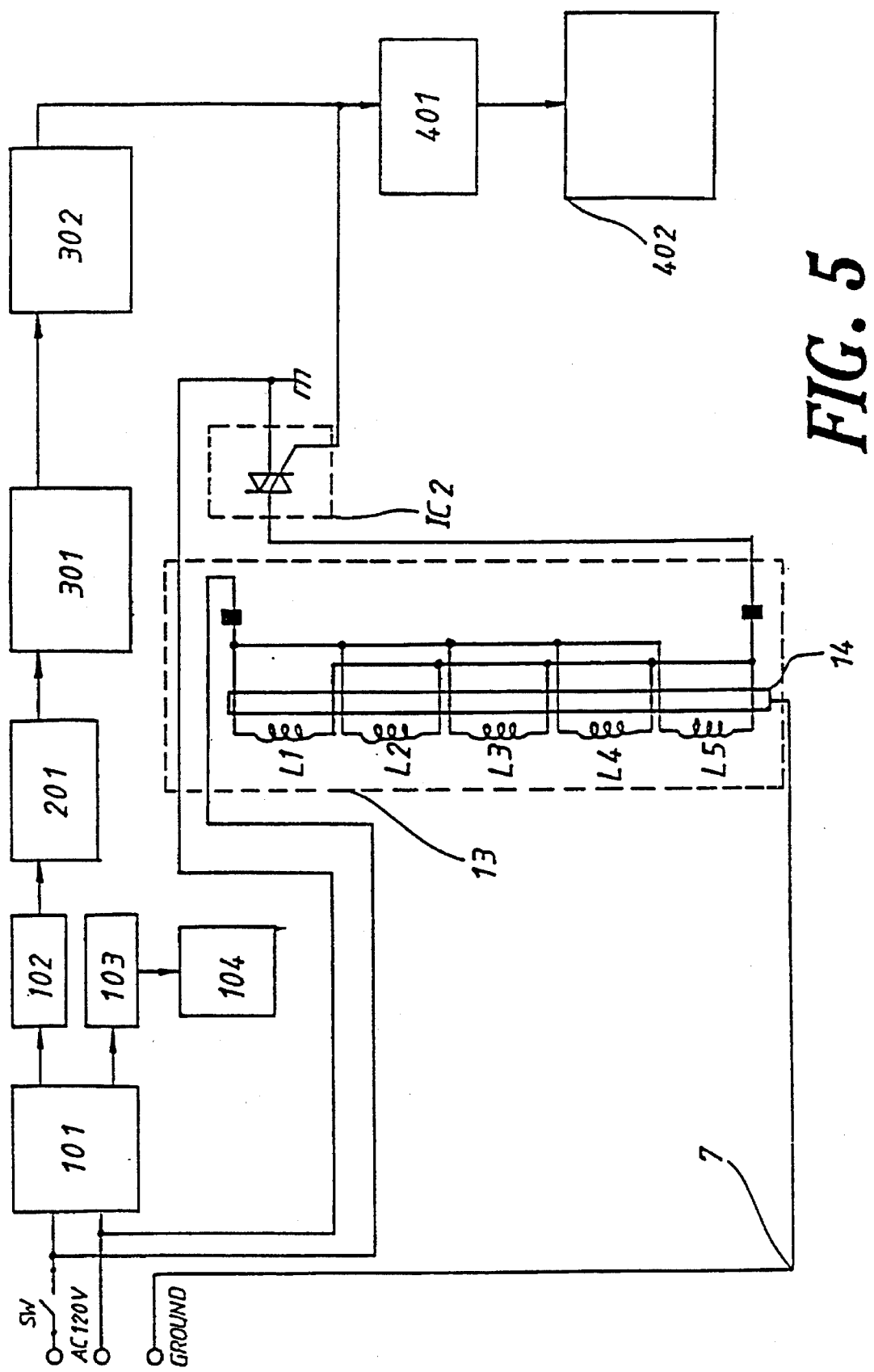
FIG. 5 is a block diagram of the circuitry shown in FIG. 3.

FIG. 5 is a block diagram of a three-wire electric system applicable for the embodiment of the invention. The three-wires electric system operates in the same way as the foregoing electric system shown in FIG. 4, but adds a ground wire 7 that can also transmit sound waves.

Figure 6:
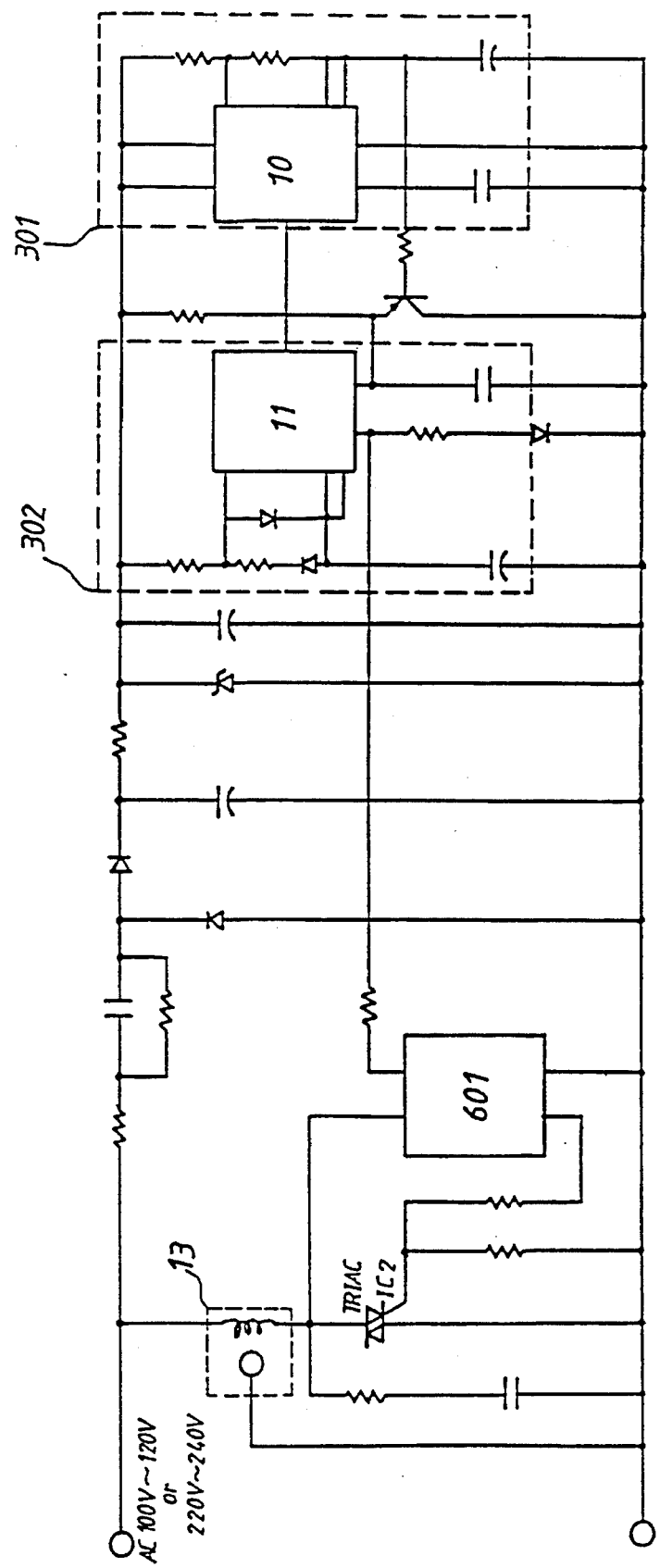
FIG. 6 is a schematic diagram of an electric circuitry for another embodiment that adds of an opto-isolator triac driver integrated circuit to the one shown in FIG. 1.

Another embodiment of the pest and insect expeller of the invention is shown in FIG. 6, in which an opto-isolator triac driver integrated circuit 601 is added to control the triac integrated circuit. In the circuitry, two astable multivibrators 301 and 302 produce signals to control the opto-isolator triac driver integrated circuit 601 and further drive the triac IC2 to activate the sound generator 13 to issue sound waves.

As described above, the intermittent and varied sound waves of the pest and insect expeller of the invention do not affect human bodies and home used electric appliances. In addition, the pest and insect expeller is provided with a heat dissipation system that enables the pest and insect expeller to work continuously for a long time. A two-wires or three-wire electric power line delivers sound waves produced by the electromagnetic sound generator to the whole electrical power system in communication with the pest and insect expeller to drive out mice and insects hidden in room corners and wall cracks. Therefore, the structure of the pest and insect expeller disclosed hereinbefore is indeed a practical and useful innovations that has not been used in public and so it fulfills the requirements of patentability.

What is claimed is:

1. A pest and insect expeller, comprising:

means for supplying electrical power;

means including a first astable multi-vibrator circuit connected to the power supply means for producing a series of intermittent waveforms;

means including a transistor circuit connected to an output of the first astable multi-vibrator circuit for producing a continuously variable voltage in response to said intermittent waveform;

means including a second astable multi-vibrator circuit connected to the transistor circuit for producing a series of varying frequency pulse-width modulated waveforms in response to said continuously varying voltage;

an electromagnetic sound generator;

means including a triac connected to the electromagnetic sound generator and to an output of the second astable multi-vibrator circuit for activating the electromagnetic sound generator in response to said varying pulse-width modulated waveforms, said sound generator including a plurality of inductance coils connected to said triac;

a fireproof casing for housing at least said electromagnetic sound generator; and means for dissipating heat resulting from the activation of said electromagnetic sound generator.

2. A pest and insect expeller as claimed in claim 1, wherein said heat dissipating means comprises a fan arranged between a hot discharge outlet on said casing and the sound generator.

3. A pest and insect expeller as claimed in claim 1, wherein said electromagnetic sound generator includes a plurality of electromagnetic coils and a steel bar passing through centers of the coils, said coils, when activated, being arranged to inductively cause the steel bar to vibrate and thereby generate said sound waves.

4. A pest and insect expeller as claimed in claim 1, wherein said electromagnetic sound generator includes a bar passing through said inductance coils and arranged to vibrate upon activation of said coils, wherein said power supply means is a three-wire power supply system which includes a ground wire, and wherein said bar is connected to said ground wire, whereby vibrations of said bar are transmitted to said ground wire.

5. A pest and insect expeller as claimed in claim 1, wherein said fireproof casing is an outer casing of the expeller and thereby serves as electrical and heat shield to protect a user from electrical leakage and high temperatures resulting from activation of said sound generator.

6. A pest and insect expeller as claimed in claim 1, wherein said second astable multi-vibrator circuit is connected to the triac by an opto-isolator triac driver integrated circuit.

* * * * *